United States Patent [19]

Lutz et al.

[11] 4,045,696

[45] Aug. 30, 1977

[54] ROTOR STATOR ASSEMBLY FOR A LOW INERTIA STEPPING MOTOR

[75] Inventors: Heinz Lutz, W.i.S.-Breitenstein; Volker Zimmermann, Schoenaich; Rainer Zuehlke, Warmbronn, all of Germany

[73] Assignee: International Business Machines Corporation, Armonk, N.Y.

[21] Appl. No.: 594,428

[22] Filed: July 9, 1975

[30] Foreign Application Priority Data

July 13, 1975 Germany .............................. 2433809

[51] Int. Cl.² .......................................... H02K 37/00
[52] U.S. Cl. .................................. 310/49 R; 310/266
[58] Field of Search ................... 310/49 R, 49 A, 266, 310/156, 269, 191, 192, 193, 162–165, 264, 261, 262, 112

[56] References Cited

U.S. PATENT DOCUMENTS

| | | | |
|---|---|---|---|
| 414,659 | 11/1889 | Seafert | 310/209 X |
| 422,862 | 3/1890 | Washburn | 310/209 X |
| 829,975 | 9/1906 | Lincoln | 310/209 |
| 1,962,832 | 6/1934 | Neureuther | 310/163 |
| 2,677,256 | 5/1954 | Donandt | 310/209 X |
| 3,001,093 | 9/1961 | Wilcox et al. | 310/266 X |
| 3,428,837 | 2/1969 | Morreale et al. | 310/49 |
| 3,519,859 | 7/1970 | Morreale et al. | 310/49 |
| 3,603,826 | 9/1971 | Saretzky | 310/266 |
| 3,689,787 | 9/1972 | Saretzky | 310/266 |

*Primary Examiner*—Donovan F. Duggan
*Attorney, Agent, or Firm*—Andrea P. Bryant; Maurice H. Klitzman

[57] ABSTRACT

A rotor stator assembly comprising a stepping motor having an improved torque-to-inertia ratio resulting from a substantial reduction in moment of inertia due to the conical shape of the rotor. A core energized by a DC coil is disposed axially of the base of the conical rotor and the magnetic path is through the base of the rotor, out its periphery, through the stator, through conductive members and back to the core. There is a further increase in torque-to-inertia ratio which is due to a decrease in rotating mass when the rotor is hollow.

9 Claims, 9 Drawing Figures

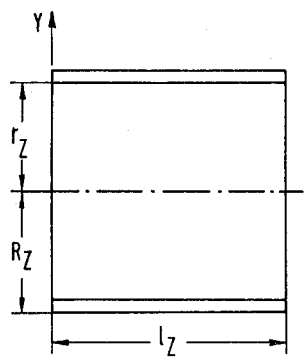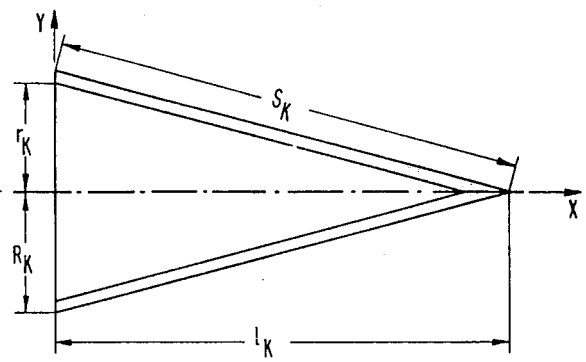
FIG. 1                FIG. 2
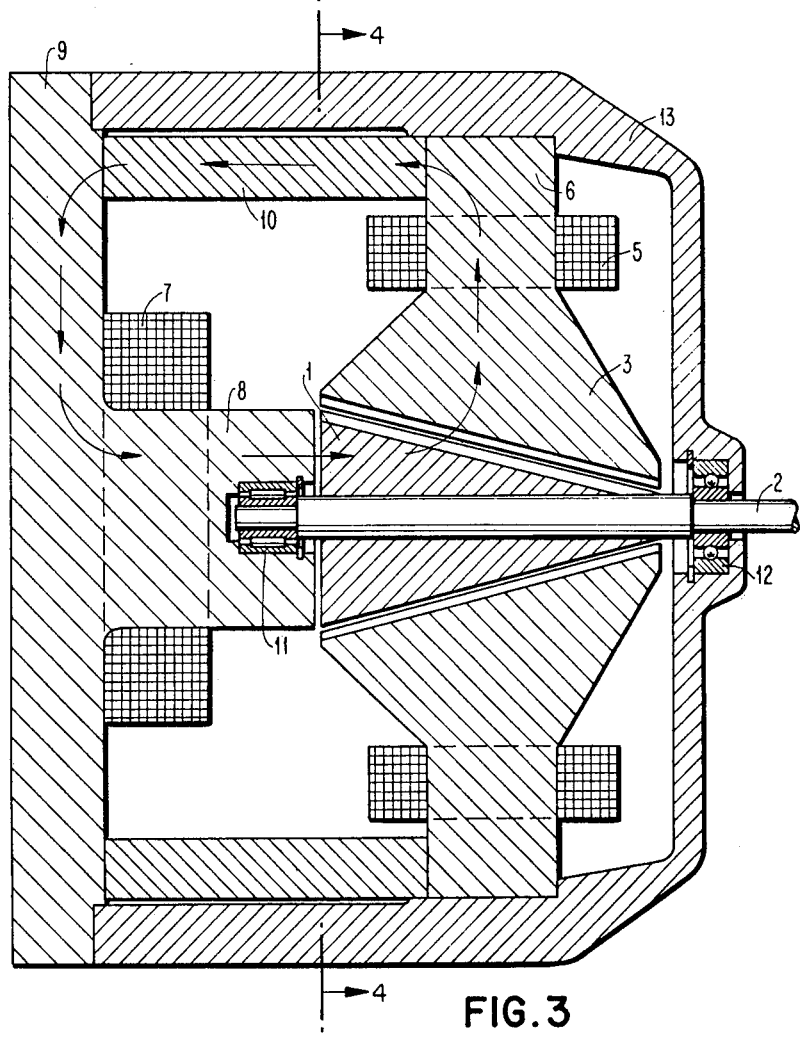
FIG. 3

ROTOR STATOR ASSEMBLY FOR A LOW INERTIA STEPPING MOTOR

BACKGROUND OF THE INVENTION

This invention relates to electrical motors of the stepping type and more particularly to a stepping motor utilizing permanent magnet excitation. The rotor is caused to advance in steps controlled by the relative spacing of the teeth on the rotor and on the poles of the stator. As the stator poles are successively energized by associated windings, the rotor moves so as to bring its teeth into registration with the teeth on the stator pole faces.

Digital information can be transformed into mechanical motion in the stepping motor where the rotor's movement through defined angles is a function of the pulses applied to the stator coils. For many applications, it is essential that the stepping motor be rapidly started and stopped. One such application is the drive of the paper feed in a high speed printer for data processing equipment where the paper is to be moved from one line to another. Since the mass of the paper to be transported is small, acceleration is essentially a function of the motor's moment of inertia.

There has been continuing effort directed towards the development of motors having a high torque-to-inertia ratio and therefore, better acceleration and deceleration. There have been brush and collector motors having hollow frusto-conical coil carrying rotors. The frusto conical shape provides enhanced mechanical braking action or ready adjustment of the air gap between rotor and stator. The low inertia of these motors was primarily attributable to the hollowness of the rotor structure and the lightness of the synthetic material used. In order to improve the torque-to-inertia ratio of stepping motors, various techniques have been used to reduce the mass of the rotor which is usually cylindrically shaped. A reduction in rotor diameter reduces inertia but also has the disadvantage of reducing torque. Hollow cylindrical rotors have a torque-to-inertia ratio improved by about a factor 2 as a result of the decrease in mass without a corresponding decrease in torque.

It is the primary object of this invention to further improve the torque-to-inertia ratio of stepping motors thereby providing better acceleration and decreased rotor oscillation.

SUMMARY

A stepping motor of the permanent magnet type having a conical rotor has a higher torque-to-inertia ratio than a stepping motor having a cylindrical rotor with the same effective surface area. This ratio is increased because the moment of inertia of a conical rotor is substantially decreased while the torque is only slightly decreased.

In accordance with the invention, a conical rotor rotates within an AC energized stator structure providing a uniform air gap. The stator structure is magnetically linked to the core means for magnetizing the rotor. The DC flux path is continuous through the base of the rotor, the teeth of the rotor, the stator, the magnetically conductive means, back to the core.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 1 is a longitudinal sectional view of a solid cylindrical rotor.

FIG. 2 is a longitudinal sectional view of a solid conical rotor in accordance with the invention.

FIG. 3 is a longitudinal sectional view of a stepping motor with a solid rotor in accordance with the invention and shows the rotor flux path.

DESCRIPTION OF THE PREFERRED EMBODIMENTS

Figure 4:
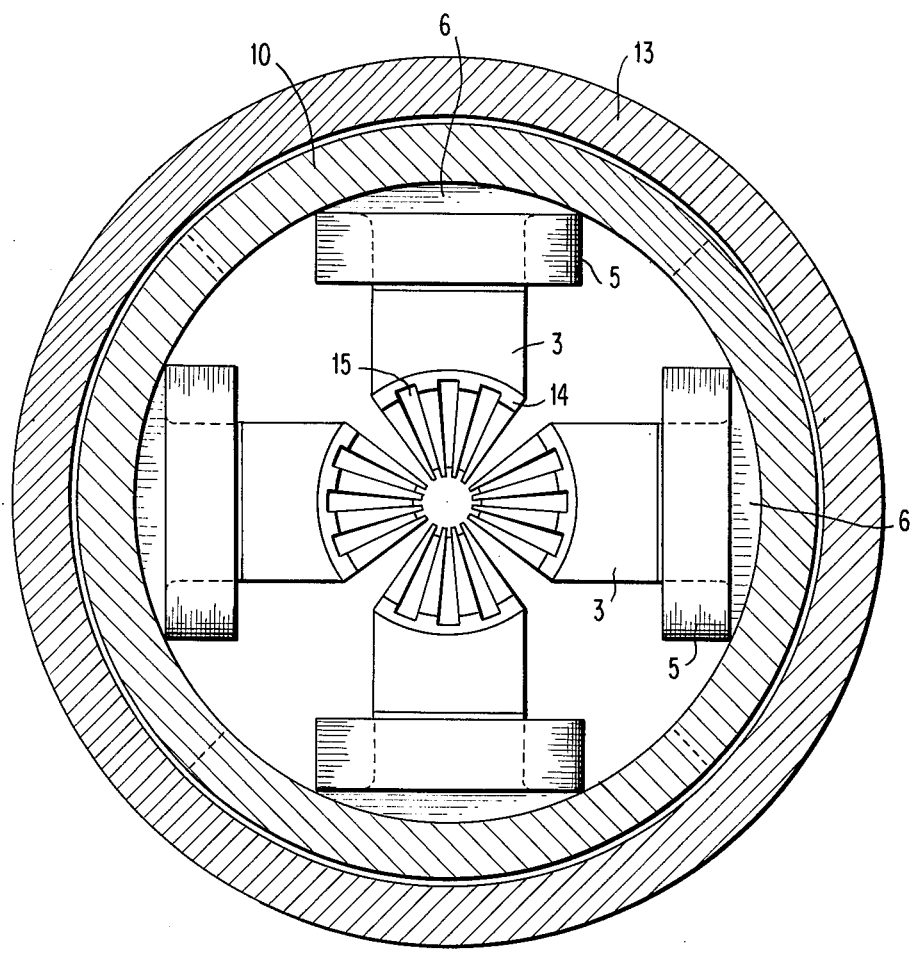
FIG. 4 is a cross sectional view of the stator structure taken along lines 4—4 of FIG. 3.

The theoretical basis of the invention will be described with reference to FIGS. 1 and 2. There follows a mathematical comparison of the characteristics of a solid cylindrical rotor and solid conical rotor having equal base radii. In both FIGS. 1 and 2, the rotor is magnetized by cores, not shown, provided with DC coils axially disposed on the left side of the rotor. There is a small air gap between the core and rotor. Stator poles, not shown, are provided around the lateral area of each rotor. In the case of the cylinder in FIG. 1, these poles are rectangularly shaped. In FIG. 2, the stator poles are tapered. In both FIGS. 1 and 2, stator pole faces are configured to form a uniform air gap between the surfaces of the rotor and the stator poles. DC flux enters the left face of each rotor and exits on the lateral area. One half of the lateral area of each rotor consists of teeth. Stator pole faces are similarly provided with teeth. In each rotor position, one quarter of the rotor teeth are directly aligned with stator teeth, two quarters of the rotor teeth half face stator teeth and one quarter of the rotor teeth are directly opposite grooves in the stator poles. Thus, in each rotor position, the DC flux entering the rotor exits from one quarter of the lateral area of the rotor. For simplicity, it will be assumed that the magnetic flux entering and exiting the rotor are identical.

The following formula applies to the cylindrical rotor of FIG. 1, $$\pi R_z^2 = \tfrac{1}{4} 2\pi R_z l_z \tag{1}$$

from which follows $$l_z = 2R_z \tag{2}$$

It is seen then, that a longitudinally square section cylindrical rotor is sufficient for exiting the total flux entering the rotor. No advantage is achieved by axially extending a cylindrical rotor since there is a corresponding increase in rotating mass with no increase in torque producing force.

Referring to FIG. 2, the length of the rotor necessary to exit the flux entering a conical rotor will be similarly computed using the formulas for the lateral area of a cone and its base area.

$$R_K{}^2\pi = \tfrac{1}{2}\pi R_K s_K \tag{3}$$

where $S_k$ is the length of the lateral area. When this equation is solved, it can be seen $$s_K = 4R_K \tag{4}$$

The axial length of the conical rotor may be found using the Pythagorean theorem and is $$l_K = 3.87\, R_K \tag{5}$$

In the following relations, 6 through 21, torque and moment of inertia will be computed for cylindrical and conical rotors having the same base radius as in FIGS. 1 and 2

$$M = \overline{K} 2\pi \int r(x)^2 \, dl \tag{6}$$

is the general formula for torque M where $\overline{K}$ is the force per element of area; $r$, the radius; and $dl$, the differential quotient of the length. The following relation is obtained from substituting the values computed for the cylindrical rotor in Equation (6) and omitting the constant factor $\overline{K} 2\pi$ $$M_Z \sim R_Z{}^2 \int_0^{l_Z} dx \tag{7}$$

From this $$M_Z \approx R_Z{}^2 l_Z \tag{8}$$

is derived and $$M_Z \approx 2R_Z{}^3 \tag{9}$$

results when $l_z$ is replaced by $2R_z$.

In a similar manner, the values for the conical rotor are substituted in Equation (6) and the constant factor $\overline{K} 2\pi$ is omitted yielding $$M_K \sim R_K{}^2 \int (1 - \tfrac{x}{l_K})^2 ds \tag{10}$$

In this relation, ds is replaced by $$ds = \sqrt{1 + \frac{dy^2}{dx^2}}\, dx = \sqrt{1 + \frac{R_K{}^2}{l_K{}^2}}\, dx \tag{11}$$

so that $$M_K \sim \frac{R_K{}^2}{3} \sqrt{l_K{}^2 + R_K{}^2} = \frac{R_K{}^2 s_K}{3} \tag{12}$$

is obtained. When $S_k$ is replaced with its value from Equation (4) results.

$$M_K \sim \tfrac{4}{3} R_K{}^3 = 1.33\, R_K{}^3 \tag{13}$$

Remembering that $R_z$ equals $R_k$, a comparison of relations 9 and 13 shows that the torque of the cylindrical rotor is slightly higher than that of the conical rotor.

The moment of inertia of a rotating symmetrical body is $$I = \tfrac{1}{2}\rho\pi \int r(x)^4 dx \tag{14}$$

In this equation $\rho$ is the density and kg.m$^{-4}$.sec$^2$. When the constant factor $\tfrac{1}{2}\rho\pi$ is omitted from this equation and values previously computed for the cylindrical rotor are substituted, the relation $$I_Z \sim R_Z{}^4 \int_0^{l_Z} dx \tag{15}$$

results and from this $$I_Z \approx R_Z{}^4 l_Z = 2R_Z{}^5 \tag{16}$$

In a like manner, when the values for the conical rotor are used in the general formula (14) for moment of inertia, $$I_K \sim R_K{}^4 \int_0^{l_K} (1 - \tfrac{x}{l_x})^4 dx \tag{17}$$

results for the cone. When the integration has been completed, $$I_K \sim \frac{R_K{}^4 l_K}{5} \tag{18}$$

results and substitution of the value for $l_k$ from Equation (5) results in $$I_K \approx R_K{}^5 (3.87/5) = 0.774\, R_K{}^5 \tag{19}$$

It can be seen then that for a cylinder and cone having the same base radius and effective surface area, the moment of inertia of a conical rotor is less than half that of a cylindrical rotor. Thus, the torque-to-inertia ratio for the cylindrical rotor is $$M_Z/I_Z = 2R_Z{}^3/2R_Z{}^5 = 1/R_Z{}^2 \tag{20}$$

and the torque-to-inertia ratio for the conical rotor is $$M_K/I_K = (1.33\, R_K{}^3/0.774\, R_K{}^5) = 1.72\,(1/R_K{}^2) \tag{21}$$

Since the greater the torque-to-inertia ratio, the higher the acceleration of a stepping motor, it is seen from Equations (20) and (21) that the acceleration of a conical rotor having the same radius as a cylindrical rotor is improved by a factor 1.72 over that of a cylindrical rotor. The same torque-to-inertia ratios are obtained for hollow cylindrical and hollow conical rotors. The rotor axial dimension relationships and the torque are identical for both solid and hollow cylindrical and conical rotors. Their moments of inertia are reduced by the moment of inertia of the omitted portion of the rotor so that $$I_Z \text{ hollow} \approx 2R_Z(R_Z^4 - r_Z^4) \tag{16'}$$

is obtained, for the moment of inertia of the hollow cylinder and $$I_K \text{ hollow} \approx 0.774 R_K(R_K^4 - r_K^4) \tag{19'}$$

is obtained for the moment of inertia of the hollow cone.

For sake of simplicity in the development of the above relationships, it was assumed that the density of the DC magnetic flux exiting the lateral area of the rotor equaled the magnetic flux density entering the front face and that the teeth and grooves on the rotor and stator poles were of equal width. It is, of course, well recognized that different relative tooth pitch and flux density would lead to slightly different rotor lengths in an analogous series of mathematical comparisons. These differences, however, do not alter the basic fact that a conical rotor has a higher torque-to-inertia ratio than a cylindrical rotor having the same effective surface area.

A further advantage of the conical rotor becomes apparent when the tendency of a stepping motor to oscillate about its neutral point when the motor is stopped is considered. The greater the attenuation of this oscillating movement is, the more rapidly the rotor comes to a standstill. The following proportional relationship applies to this attenuation $d$.

$$d \approx 1/\sqrt{MI} \tag{22}$$

where M is torque, and I the moment of inertia. When the values derived from relations 9 and 16 and 13 and 19 are inserted in relation 22, it is apparent that the attenuation of the conical rotor is almost double that of the cylindrical rotor. In other words, when a stepping motor having a conical rotor is stopped, the rotor will not oscillate around its neutral point as long as a cylindrical rotor of equal base radius.

Exemplary stepping motors in accordance with the invention are described in detail having reference to FIGS. 3 through 9.

Figure 5:
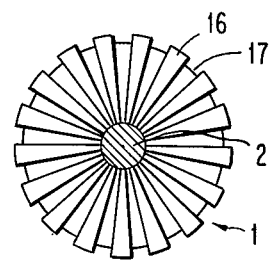
FIG. 5 is an end view of the rotor for the stepping motor of FIG. 3 and shows its toothing.

FIGS. 3, 4 and 5 show a motor constructed in accordance with the relations previously developed. FIG. 3 is a longitudinal cross section of a stepping in accord with the invention having a solid conical rotor and illustrates the DC flux path. FIG. 4 shows a cross section of the stator structure and flux conducting means of this motor taken along line 4—4 in FIG. 3. FIG. 5 is an end view of the solid rotor showing its toothing.

In FIG. 3, rotor 1 is supported by a shaft 2. Four stator poles 3 are positioned around the rotor 1 and form a uniform air gap therewith. The stator pole faces are coextensive with the axially toothed lateral area of rotor 1. AC coils 5 are wound around each stator pole 3. Coils 5 of poles diametrically opposite each other are wound in the same sense and linked to each other. The radially outward extreme ends of stator poles 3 lead into a magnetically conductive ring 6 which completes the return path for the AC stator flux.

Ferromagnetic core 8 is axially disposed from the rotor 1 forming a small air gap therebetween. The cross sectional area of core 8 adjacent the base of the rotor 1 is substantially the same as the base of the rotor. A DC energized coil 7 is wound on core 8. Core 8 is connected to a magnetically conductive circular plate 9 which forms part of the motor housing. Plate 9 is connected to ring 6 by magnetically conductive ring 10. The DC flux follows the path indicated by the dashed lines in FIG. 3 through the base of the rotor out the rotor teeth into the stator pole teeth through rings 6 and 10, the circular plate 9, back into core 8.

Shaft 2 at one end is mounted in needle bearings in core 8 and has its other end supported in ball bearings in the housing lid 13. Housing lid 13 serves also to seal the stepping motor. Needle bearing 11 is subjected to low stresses only and can therefore be made as small as possible to prevent interference with the magnetic field lines in core 8. Since the DC flux can enter stator poles 3 only through the teeth it is obvious that a stator pole 3 is double the size required by a given flux density B entering the rotor. There are therefore no problems caused in the magnetic circuit when the cross section of stator poles 3 tapers as shown. In conforming to the shape of the rotor, the stator poles 3 are wedge shaped in the area of the pole shoes. Stator flux follows a path including the rotor from one energized pole to the opposite pole and returns via ring 6. The torque resulting from the interaction of the DC rotor flux and AC stator flux in the area of the teeth is available at the end of the shaft extending from the motor housing.

Figure 6:
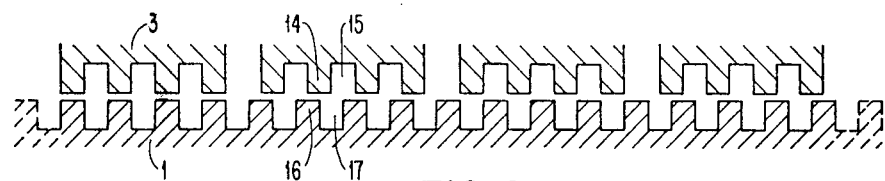
FIG. 6 is a developed view of the relative toothing of the rotor and the stator poles of the stepping motor shown in FIG. 3.

The toothing on the stator pole faces 3 can be seen in FIG. 4 and in an unwound form in FIG. 6. In the exemplary embodiment, each stator pole has four teeth 14 and three grooves 15. The distance between two stator poles is 1½ tooth widths. As seen in FIG. 5, rotor 1 has 17 teeth 16 which are equally spaced on the rotor surface. The width of teeth 16 is equal to the width of grooves 17.

Figure 7:
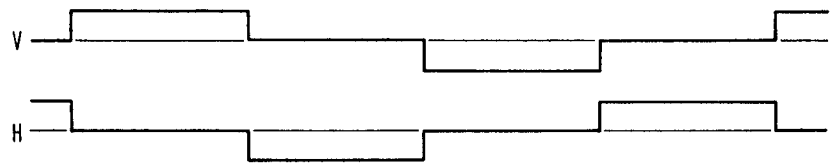
FIG. 7 shows the pulse sequences applied to the stator coils of the stepping motor shown in FIG. 3.

When stator poles 3 are excited as shown by the pulse sequences in FIG. 7 where V is the voltage applied to the vertically arranged stator poles and H is the voltage applied to the horizontally arranged stator poles, a magnetic field of rotation is set up which is cyclically rotated by 90° in each step. In the case of the excitation pattern shown in FIG. 7, the stepping motor of the invention operates in what is known as the semi-step mode.

It is, of course, recognized that full step mode of operation is also possible wherein the vertical and horizontal stator poles are always simultaneously excited. It is equally apparent that the sense of rotation of the magnetic field of rotation and thus of rotor 1 can be reversed by pole reversal in one of the two pulse sequences.

When coil 7 on core 8 is energized, rotor 1 is magnetized to one polarity, for example, south. Referring now to FIG. 6, which shows the relative toothing of rotor 1 and stator poles 3. When for example, the polarity of rotor teeth 16 is south, and the stator poles 3 are energized to result in the semi-step mode of operation, the second stator pole from the left in FIG. 6 is excited as a north pole and the fourth pole from the left as a south pole in the first phase. Rotor teeth 16 closest to the second stator pole are attracted to its teeth 14 whereas the teeth 16 closest to the fourth stator pole are repelled by those stator pole teeth 14 so that rotor teeth 16 eventually would face station grooves 15. In the next phase, the third stator pole from the left is the north pole and the first stator pole is the south pole whereby forces of repulsion and attraction cause the rotor movement to continue.

Although we have described the invention as embodied in a motor having only four stator poles 3 and 17 teeth 16 on the rotor, it is recognized that a rotor in accordance with the invention can, of course, be used in stepping motors having different numbers of stator poles and/or different relative toothing arrangements on the rotor and stator poles.

In the exemplary stepping motor described, rotor 1 and stator poles 3, in order to have desirable low reluctance are produced by sintering fine grained or pulverulent iron in molds.

It is apparent from FIG. 3 that the construction of a stepping motor in accordance with the invention allows substantial magnetic flux to follow preferred paths, thereby reducing losses due to flux leakage.

In the mathematical comparison previously set forth, the optimum length of a perfectly conical rotor, as shown in FIG. 2, was determined to be 3.87 times the base radius $R_k$. Rotor 1 in FIG. 3 is frusto-conical since the shaft 2 extends through the rotor eliminating the tip of the cone. At its narrow end the rotor 1 and shaft 2 merge with each other. In other words, the outer diameter of the rotor 1 at its narrow end is substantially the same as the diameter of the shaft 2. When the referenced calculations are applied to a frusto-cone in accordance with the configuration of FIG. 3, and the radius of shaft 2 at the narrow end of the rotor is, for example, 1/5 of the base radius of the conical rotor; then the resulting length of rotor 1 is computed to be 3.2 times its base radius.

Although, we have chosen a shaft radius of 1/5 the base rotor radius as exemplary, it is, of course, recognized that other similar relative short sizes are applicable. The advantages of the invention are best realized when the shape of the rotor approaches that of a perfect cone rather than a cylinder. When the rotor is shortened, the torque-to-inertia-ratio is decreased, but in the case of a rotor mounted on a shaft having a radius equal to 1/5 that of the base radius of the rotor, that ratio is $1.65/R^2_k$, still considerably superior to a solid cylindrical rotor having the same base radius.

Figure 8:
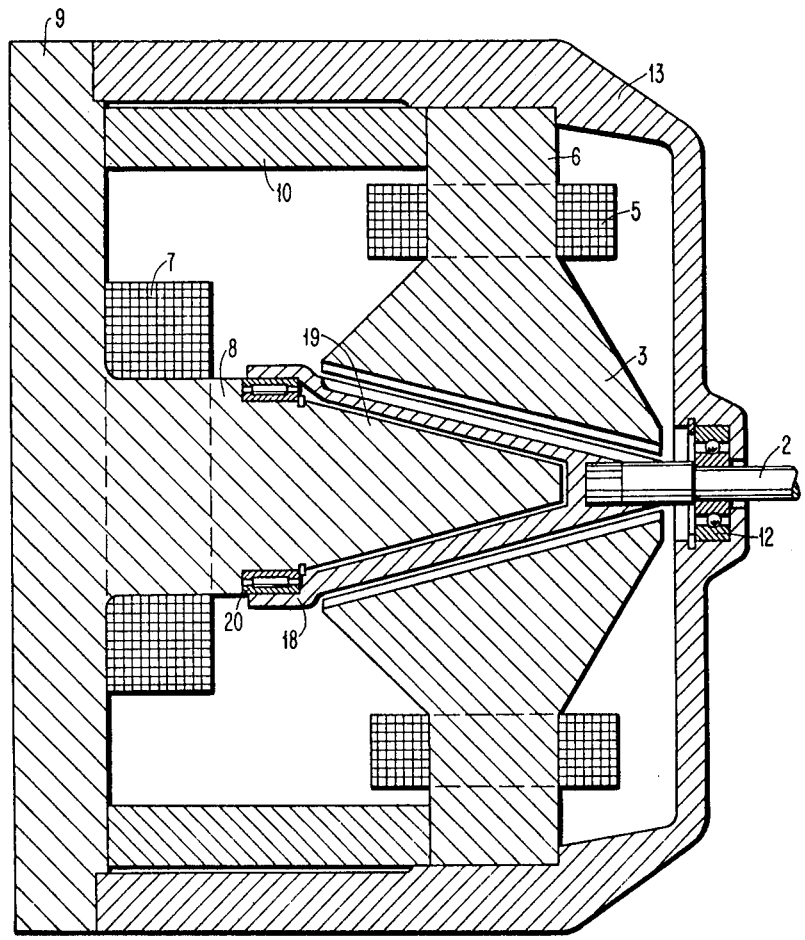
FIG. 8 is a longitudinal sectional view of a stepping motor in accordance with the invention with a hollow rotor.

FIG. 8 shows another embodiment of the invention in which the conical rotor 18 is hollow. Motor parts in FIG. 8 corresponding to those in FIGS. 3, 4 and 5 have the same reference numbers. In the stepping motor of FIG. 8, core 8 has a portion 19 extending into the interior of the hollow rotor 18. This extension 19 is substantially in the form of a cone for forming a uniform air gap between core surfaces and interior rotor surfaces. Rotor 18 is peripherally toothed in the axial direction and the toothed area of the rotor 18 is coextensive with the axially toothed stator pole faces. A portion of rotor 18 which is not toothed extends beyond the stator pole faces and is rotatably supported in needle bearing 20 on core 8. Bearing 20 is made as small as possible in order to avoid an increase in the moment of inertia of rotor 18. As mentioned earlier, the hollow structure of the rotor causes its torque-to-inertia ratio to be improved by about a factor 2. The conical structure results in a further improvement in torque-to-inertia ratio by a factor 1.65 if shaft 2 is assumed to have a radius 1/5 as large as the rotor base area so that the stepping motor shown in FIG. 8 has a torque-to-inertia ratio improved by about a factor of 3.3 over that of a stepping motor having a solid cylindrical rotor of the same base radius. FIG. 4 is equivalent to a cross section view of the stator portion of the stepping motor shown in FIG. 8.

While FIG. 8 is an exemplary embodiment of our invention, it is obvious to those skilled in the art that needle bearing 20 on core 8 could be positioned further to the right, that is, on the conical portion 19 thereby precluding the need to have a part of the rotor extending beyond the stator pole faces. In the same connection, needle bearing 20 may be eliminated entirely and a single support for the rotor be provided by cantilever mounting shaft 2 in the housing lid 13. In other words, shaft 2 can be completely supported on one end by providing additional bell bearings 12.

Figure 9:
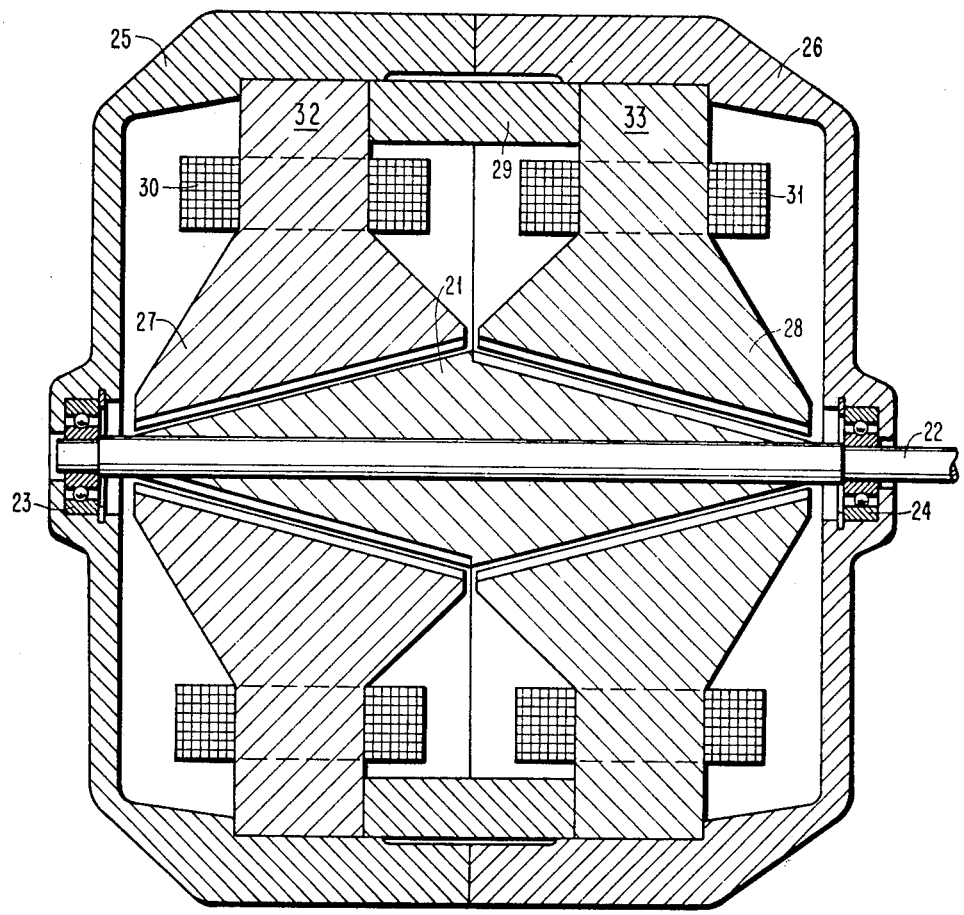
FIG. 9 is a longitudinal sectional view of a stepping motor in accordance with the invention with a double conical rotor.

In FIG. 9, a further example of a stepping motor in accordance with the invention is shown. In this embodiment, rotor 21 has the shape of a double cone and is permanently magnetic in the axial direction. Rotor 21 is supported by shaft 22 which rotatably mounted on the one end in bearing means 23 in housing member 25 and on the other end in bearing means 24 in the housing member 26. Two stator structures having poles 27 and 28 are provided. AC coils 30 are wound on poles 27 and in a like manner AC coils 31 are wound on poles 28. Stator poles 27 in the radially outward direction extend into magnetic ring 32 and likewise poles 28 extend into magnetic ring 33. Rings 32 and 33 are magnetically connected by ring 29. The two groups of stator poles faces are spacedly positioned from the rotor surface to provide a uniform air gap. A cross section of FIG. 9, taken on the axial midpoint of the rotor and showing the stator structure would look like FIG. 4 where housing member 26 corresponds to housing lid 13, conductive ring 29 corresponds to ring 10 and conductive ring 33 corresponds to 6.

As in the embodiments shown in FIGS. 3 and 8, the stepping motor of FIG. 9 provides two magnetic circuits. The AC stator flux leaves one pole, traverses the rotor and enters the pole of opposite polarity. The rings 32 and 33 complete the flux return paths. The DC flux passing the rotor axially follows a path, for example, through the stator 28, ring 33, ring 29 through conductive ring 32, stator pole 27, and back to rotor 21.

Coils 30 and 31 energizing stators 27 and 28 are wound in the same sense and may be excited at the same time so that poles of equal polarity are generated on the teeth of the faces of stator poles 27 and 28. In this case, the toothing on the axially symmetrical halves of the rotor would be staggered 180° so that resulting torques coact.

It is, of course, readily apparent that the toothing on axially adjacent stator pole faces could be staggered in relation to each other.

It is likewise within the scope of this invention to fabricate axially adjacent stator poles and the conductive member 29 as an integral assembly. In such a case, it would be desirable to divide the motor housing horizontally in the axial direction.

From the foregoing description, it will be apparent that a stepping motor constructed in accordance with the present invention provides a motor capable of faster starting and stopping due to a substantial increase in torque to inertia ratio resulting from the conical shape of the rotor.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A rotor stator assembly for increasing the torque-to-inertia ratio of a low inertia stepping motor including:
   a motor housing;

a solid substantially conical magnetizable rotatably mounted rotor, the surface of which is toothed in the axial direction;

a stator structure including a plurality of inwardly extending poles having AC coils wound thereon and having axially toothed faces axially coextensive with said rotor and spacedly positioned for maintaining a uniform air gap about said rotor;

ring means magnetically connecting said stator poles and forming AC flux paths with said rotor;

nonrotatable core means, having a DC coil wound thereon, axially disposed from said rotor and forming a uniform air gap between the base of said rotor and a face of said core means for magnetizing said rotor;

said face having substantially the same cross sectional area as the base of said conical rotor;

a shaft mounted in bearing means in said housing and said nonrotatable core means for supporting said rotor;

magnetically conductive members connecting said stator stucture and said nonrotatable core means for forming a continuous DC flux path through the base of said rotor, the lateral area of said rotor, said stator structure, said magnetically conductive members and said nonrotatable core means.

2. A rotor stator assembly for increasing the torque-to-inertia ratio of a low inertia stepping motor including:

a motor housing;

a hollow, substantially conical magnetizable rotatably mounted rotor, the surface of which is toothed in the axial direction;

a stator structure including a plurality of inwardly extending poles having AC coils wound thereon and having axially toothed faces axially coextensive with said rotor and spacedly positioned for maintaining a uniform air gap about said rotor;

ring means magnetically connecting said stator poles and forming AC flux paths with said rotor;

nonrotatable core means having a substantially conical portion extending into the interior of said hollow rotor and forming a uniform air gap therebetween for magnetizing said rotor;

magnetically conductive members connecting said stator structure and said nonrotatable core means for forming a continuous DC flux path through lateral area of said stator structure, said magnetically conductive members and said nonrotatable core means.

3. A rotor assembly in accordance with claim 1 wherein said solid rotor and said stator poles are fabricated by sintering iron in molds.

4. A rotor stator assembly in accordance with claim 2 wherein the narrow end of said hollow rotor is supported by a shaft rotatably mounted in said housing and the wide end of said hollow rotor extends beyond said stator pole faces and is rotatably supported by bearing means mounted on said nonrotatable core means.

5. A rotor stator assembly as in claim 2 wherein the lateral surface of said hollow rotor is axially coextensive with said stator pole faces and the narrow end of said hollow rotor is supported by a shaft rotatably mounted in said housing and the wide end of said hollow rotor is supported by bearing means on the portion of said nonrotatable core means extending into the interior of said hollow rotor.

6. A rotor stator assembly in accordance with claim 2 wherein the narrow end of said hollow rotor is supported by a shaft cantilever mounted in bearing means in said housing.

7. A rotor stator assembly for a low inertia stepping motor comprising:

a housing;

a rotor substantially in the form of a double cone permanently magnetized and peripherally toothed in the axial direction;

a shaft mounted in bearing means in said housing for supporting said rotor;

two stator structures including a plurality of inwardly extending poles having AC coils wound thereon and axially toothed pole faces spacedly positioned adjacent to each conical of said rotor for maintaining a uniform air gap about said rotor;

said double cone rotor and stator structures increasing the torque-to-inertia ratio;

magnetically conductive rings connecting said polarity of stator poles for each conical half of said rotor for forming with said rotor AC flux paths;

a magnetically conductive cylindrical member connecting said magnetically conductive rings for forming paths for the axial DC rotor flux.

8. A rotor stator assembly in accordance with claim 7 wherein the toothing of axially adjacent stator pole faces is staggered in relation to each other.

9. A rotor stator assembly in accordance with claim 7 wherein the toothing of one half of said rotor is staggered relative to the other half of said rotor.

* * * * *